March 28, 1944.  G. M. MIERLEY  2,345,410
CLUTCH AND BRAKE MECHANISM
Filed July 28, 1942  2 Sheets-Sheet 1

WITNESSES:
J. F. Mosser
E. V. Arnold

INVENTOR
GEORGE M. MIERLEY
BY
A. B. Ruiss
ATTORNEY

March 28, 1944.　　　G. M. MIERLEY　　　2,345,410
CLUTCH AND BRAKE MECHANISM
Filed July 28, 1942　　　2 Sheets-Sheet 2

INVENTOR
GEORGE M. MIERLEY.
BY
ATTORNEY

Patented Mar. 28, 1944

2,345,410

UNITED STATES PATENT OFFICE 2,345,410

CLUTCH AND BRAKE MECHANISM

George M. Mierley, Upper Darby, Pa., assignor to Westinghouse Electric & Manufacturing Company, East Pittsburgh, Pa., a corporation of Pennsylvania Application July 28, 1942, Serial No. 452,597

6 Claims. (Cl. 192—18)

The invention relates to an improved clutch and brake organization and it has for an object to provide apparatus of this character which is particularly suitable for connecting the backing turbine of a locomotive to the driving axle or axles, the brake being rendered effective when the clutch is released to guard against idle rotation of the backing turbine due to leakage of steam by the valve for the latter.

A further object of the invention is to provide a clutch and a brake wherein a spring serves to release the clutch and render the brake effective and wherein fluid under pressure is applied against the force of the spring to connect the clutch.

A further object of the invention is to provide a clutch including driving and driven members and a non-rotatable brake ring and wherein the driving member includes telescopic parts moved relatively by means of a spring to effect clutch disconnection and to grip the brake ring and moved relatively against the force of the spring by the application of fluid pressure to release the brake ring and to effect clutch engagement.

These and other objects are effected by the invention as will be apparent from the following description and claims taken in connection with the accompanying drawings, forming a part of this application, in which:

Figure 1:
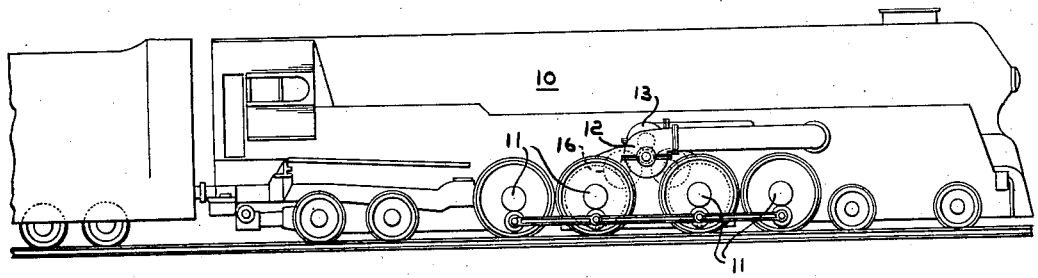
Fig. 1 is a view of a locomotive showing the invention applied thereto.

In the drawings, there is shown a locomotive, at 10, having one or more driving axles 11. The locomotive has a forward turbine 12 and a backing turbine 13, valves 14 and 15 being provided to control the supply of motive fluid to the respective turbines.

Power is transmitted from the forward turbine to the driving axle or axles by means of the main reduction gear, at 16, the turbine being connected to the reduction gear by means of the driving or quill shaft 17. Additional reduction gearing, at 18, is arranged to operate in series with the main reduction gearing, at 16, to transmit power from the backing turbine to the driving axle or axles, the additional reduction gearing being provided with a driven shaft 19 which is axially aligned with the driving or quill shaft 17.

A clutch, at 20, serves to connect the shafts 19 and 17 for the transmission of power from the backing turbine to the driving axle or axles.

To guard against spinning of the backing turbine due to possible leakage of steam past the valve 15, a brake, at 21, is rendered effective incident to disconnection of clutch.

The clutch includes a shifting sleeve 22 and a driven member 23 having any suitable means, for example, the jaw teeth 24 and 25, for transmitting torque from the sleeve to the member. The driven member is fixedly secured to the quill shaft and the shifting sleeve is connected by a driving head 26 to the shaft 19, the head being fixedly secured to the shaft and having internal teeth 28 engaging the teeth 29 on the shifting sleeve, the former teeth being longer than the latter to provide a torque-transmitting connection in all axial positions of the shifting sleeve. The shifting sleeve 22 is moved axially, in one direction, to engage the clutch teeth 23 and 24 and, in the other direction, to cause opposed braking surfaces 30 and 31 formed on the head and the shifting sleeve to grip the brake ring 32 carried by the gear housing 33.

The driving head 26 has a hub 34 fixedly secured to the shaft 19. The end of the hub nearer to the clutch teeth has an outwardly-extending flange 36 and the shifting sleeve 22 has an inwardly-extending flange 37 at the opposite end, a spring 38 being arranged between the flanges so that its force is effective to move the shifting sleeve 22 in a direction to disengage the clutch teeth 24 and 25 and to cause the opposed braking surfaces 30 and 31 to grip opposed surfaces formed on the brake ring 32.

Fluid under pressure is utilized to cause the shifting sleeve 22 to move against the force of the spring to effect engagement of the teeth 24 with the teeth 25. To this end, the driving head 26 is constructed to provide a cylinder with which the shifting sleeve cooperates as a piston to define the expansible chamber 40 to which fluid under pressure is admitted by the connecting passages 41 and 42 formed in the hub 34 and in the shaft 19, respectively.

The driving head includes a radial wall 43 which is joined to the laterally-extending annular flange or wall 44 overhanging the hub 34 to provide an annular space. The wall has an inner cylindrical surface 45 and the shifting sleeve 22 has an inner cylindrical surface 46. The shifting sleeve has a flange or piston portion 48 provided with a piston ring 49 engaging the interior cylindrical surface 45 and the flange 36 has a piston ring 50 engaging the interior cylindrical surface 46. Thus, the telescoping shifting sleeve 22 is sealed with respect to the driving head so as to form the expansible chamber 40.

The cone ring 32 is connected to the gear housing 33 by means permitting of relative floating movement of the former while restraining any relative rotary movement thereof. Also, the cone ring is preferably faced at opposite sides with any suitable brake lining material 52. With this arrangement, floating of the cone ring accommodates opposed surfaces thereof to the opposed gripping surfaces 30 and 31 when the brake is effective.

The gear housing 33 supports the floating cone brake ring 32 from its interior and it encloses the clutch, at 20, the housing extending inwardly to provide a supporting hub portion 55 for the shaft 19, a roller bearing 56 preferably being interposed therebetween.

In order that liquid under pressure may be supplied through the communicating passages 42 and 41 to the expansible chamber 40, the gear casing is preferably provided with an oil inlet and exhaust passage 57 whose inner end communicates with the annular channel 58 formed therein for the oil seal ring 59 having inner shroud flanges 60 fitting the shaft 19 to provide an annular chamber 61 open to the radial passage 62 formed in the shaft and communicating with the passage 42. Thus, it will be seen that the seal ring is movable radially in the channel 58 so that it may be maintained in proper co-axial relation with respect to the shaft 19.

Figure 2:
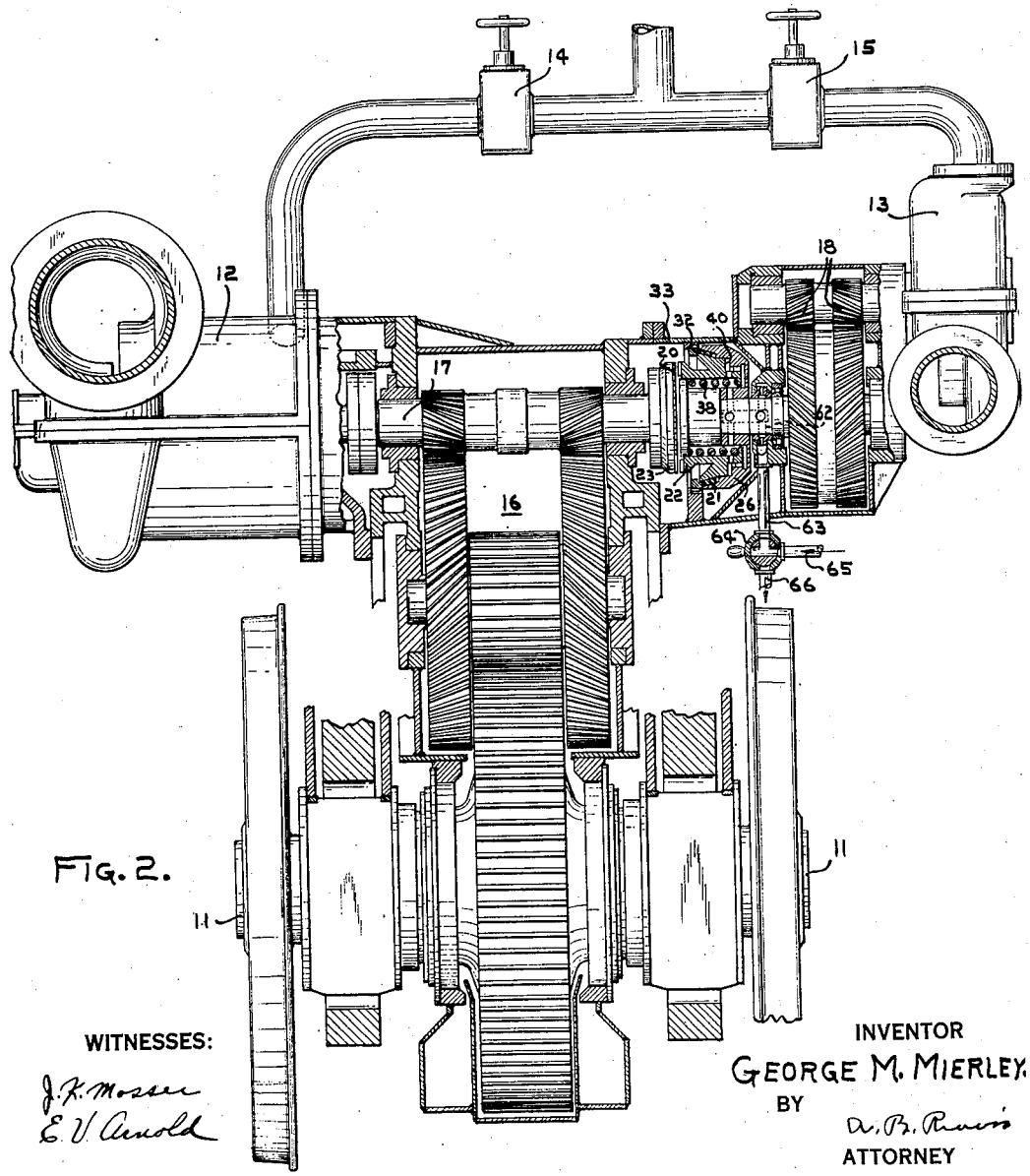
Figs. 2 and 3 are detail sectional views of the improved clutch and brake arrangement.
Figure 3:
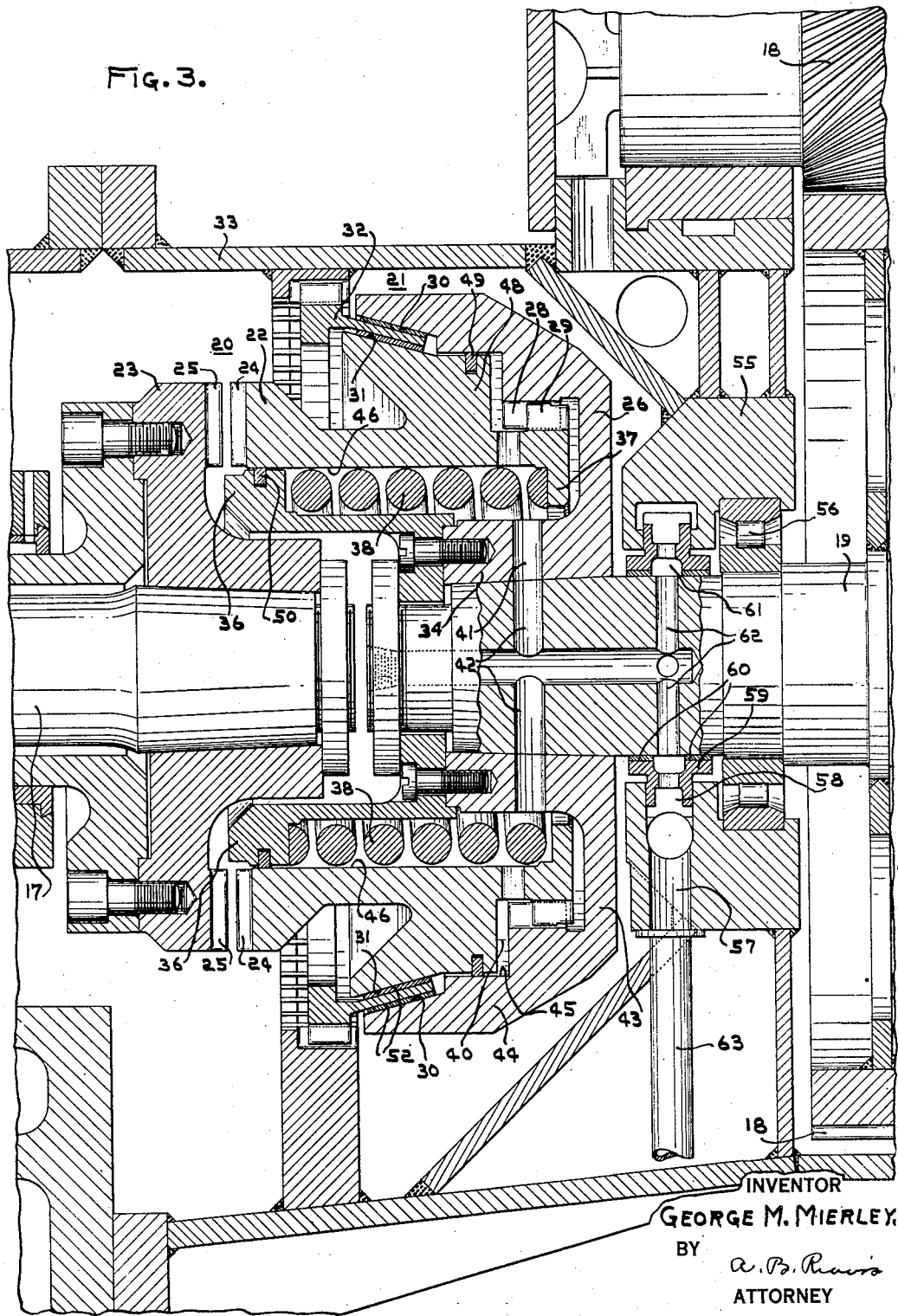

The oil inlet and exhaust passage 57 may be connected in any suitable manner to a pressure source and a driving or exhaust space. As shown in Fig. 2, the passage 57 communicates with a pipe 63 connectible by means of a valve 64 either with the pressure supply passage 65 or the exhaust passage 66.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In combination, a driven jaw clutch member, a driving head having a first inner cylindrical surface, a driving jaw clutch member, a sleeve integral with the driving clutch member and having a second inner cylindrical surface spaced radially inward from said first cylindrical surface, a slidable key connection between the driving head and the sleeve, pistons on the sleeve and on the head and cooperating with said first and second cylindrical surfaces, respectively, so that the sleeve and the head define an expansible chamber, means providing for the admission of motive fluid to said chamber to move the sleeve to engage the clutch members and providing for the exhaust of motive fluid from the chamber, and a spring arranged between the head and the sleeve and effective to disengage the clutch members when the last-named means is effective to provide for the exhaust of motive fluid from the chamber.

2. In combination, a driven jaw clutch member, a driving head having a first inner cylindrical surface, a driving jaw clutch member, a sleeve integral with the driving clutch member and having a second inner cylindrical surface spaced radially inward from said first cylindrical surface, a slidable key connection between the driving head and the sleeve, pistons on the sleeve and on the head and cooperating with said first and second cylindrical surfaces, respectively, so that the sleeve and the head define an expansible chamber, means providing for the admission of motive fluid to said chamber to move the sleeve to engage the clutch members and providing for the exhaust of motive fluid from the chamber, a spring arranged between the head and the sleeve and effective to disengage the clutch members when the last-named means is effective to provide for exhaust of motive fluid from the chamber, said head and sleeve having opposed conical surfaces formed thereon, and a floating and non-rotatable brake ring having an inner conical portion provided with opposed braking surfaces cooperating with the conical surfaces of the sleeve and the head to exert braking effort on the latter under influence of said spring.

3. In combination, a driven jaw clutch member, a driving head having a first inner cylindrical surface, a driving jaw clutch member; a sleeve integral with the driving clutch member and having a second inner cylindrical surface spaced radially inward from said first cylindrical surface; a slidable key connection between the driving head and the sleeve; pistons on the sleeve and on the head and cooperating with said first and second cylindrical surfaces, respectively, so that the sleeve and the head define an expansible chamber; means providing for the admission of motive fluid to said chamber to move the sleeve to engage the clutch members and providing for the exhaust of motive fluid from the chamber; a spring arranged between the head and the sleeve and effective to disengage the clutch members when the last-named means is effective to provide for exhaust of motive fluid from the chamber; a casing enclosing the clutch members, the head and the sleeve; said head and sleeve having opposed conical surfaces formed thereon; a brake ring having a inner conical portion provided with opposed braking surfaces cooperating with the conical surfaces of the sleeve and the head to exert braking effort on the latter under influence of said spring; and key means connecting the casing to the ring so as to prevent rotary movement of the latter and providing for axial and radial movements thereof to accommodate its conical surfaces to the conical surfaces of the head and sleeve.

4. In combination, driving and driven shafts; a driven jaw clutch member attached to the driven shaft; a driving head attached to the driving shaft and having a first inner cylindrical surface; a driving jaw clutch member; a sleeve integral with the driving clutch member and having a second inner cylindrical surface spaced radially inward from said first cylindrical surface; a slidable key connection between the sleeve and the driving head; pistons on the sleeve and on the head and cooperating with said first and second cylindrical surfaces, respectively, so that the sleeve and the head define an expansible chamber; means providing for the admission of motive fluid to said chamber to move the sleeve to engage the clutch members and providing for the exhaust of motive fluid from the chamber; a spring arranged between the head and the sleeve and effective to disengage the clutch members when the last-named means is effective to provide for exhaust of motive fluid from the chamber; and a casing enclosing the clutch members, the sleeve and the driving head; said means providing for the admission and exhaust of motive fluid including an inwardly-opening channel formed in the casing and having parallel and radial side walls, a ring having sealed bearing relation with respect to the driving shaft and fitting said channel, and communicating passages formed in the casing, in the ring and in the driving shaft and including the portion of said channel disposed outwardly of the ring.

5. In combination, driving and driven shafts; a driven jaw clutch member attached to the driven shaft; a driving head attached to the driving shaft and having a first inner cylindrical surface; a driving jaw clutch member; a sleeve integral with the driving clutch member and having a second inner cylindrical surface spaced radially inward from said first cylindrical surface; a slidable key connection between the sleeve and the driving head; pistons on the sleeve and on the head and cooperating with said first and second cylindrical surfaces, respectively, so that the sleeve and the head define an expansible chamber; means providing for the admission of motive fluid to said chamber to move the sleeve to engage the clutch members and providing for the exhaust of motive fluid from the chamber; a spring arranged between the head and the sleeve and effective to disengage the clutch members when the last-named means is effective to provide for exhaust of motive fluid from the chamber; a casing enclosing the clutch members, the sleeve and the driving head; said means providing for the admission and exhaust of motive fluid including an inwardly-opening channel formed in the casing and having parallel and radial side walls, a ring having sealed bearing relation with respect to the shaft and fitting said channel, and communicating passages formed in the casing, in the ring and in the driving shaft and including the portion of said channel disposed outwardly of the ring; said head and sleeve having opposed conical surfaces formed thereon and disposed outwardly of the first cylindrical surface; a brake ring having an inner conical portion provided with opposed braking surfaces cooperating with the conical surfaces of the sleeve and the head to exert braking effort on the latter under influence of said spring; and key means connecting the interior of the casing to the periphery of the brake ring and effective to prevent relative rotational movement thereof while permitting the ring to move axially or radially to accommodate its surface to the conical surfaces of the head and of the ring incident to establishing the braking operations.

6. In combination, axially-aligned driving and driven members, a driving head carried by the driving member, said head having a central hub and an overhanging flange providing a laterally-open annular space, a sleeve having a driving clutch element and movable axially relative to the driving head, said sleeve having at least a portion thereof extending within said annular space, a driven clutch element for engagement by the driving clutch element and connected to the driven member, a spline connection between the driving head and the sleeve and located within said annular space, means carried by the hub and flange of the driving head and by the sleeve and cooperating to provide an expansible chamber so that, with fluid under pressure supplied to the latter, the sleeve is moved to engage the clutch elements, said driving head flange and sleeve having portions thereof provided with braking surfaces disposed in opposed and spaced relation, a brake ring restrained against rotation and having opposed braking surfaces interposed between the first braking surfaces, said sleeve having an inwardly-extending abutment at the end thereof within the annular space and remote from the end having the driving clutch element and said hub having an outwardly-extending abutment spaced axially therefrom and located adjacent to the driving clutch element end of the sleeve, a compression spring arranged between the abutments and exerting force on the sleeve to disengage the clutch element thereof from the driven clutch element and to cause the braking surfaces thereof and of the driving head to grip the braking surfaces of the ring, and means providing for the supply of fluid under pressure to the expansible chamber to effect movement of the sleeve against the force of the spring to engage the clutch elements and release the braking surfaces and providing for the exhaust of fluid from the chamber to render the spring effective to engage the braking surfaces and release the clutch elements.

GEORGE M. MIERLEY.